United States Patent [19]
Lisiecki

[11] 3,723,060
[45] Mar. 27, 1973

[54] ASEPTIC PACKAGING MACHINE

[75] Inventor: Robert E. Lisiecki, Orchard Lake, Mich.

[73] Assignee: Ex-Cell-O Corporation, Detroit, Mich.

[22] Filed: Jan. 11, 1971

[21] Appl. No.: 105,449

Related U.S. Application Data

[62] Division of Ser. No. 708,337, Feb. 26, 1968, Pat. No. 3,566,575.

[52] U.S. Cl. ............................21/91, 21/58
[51] Int. Cl. .....................................A61l 3/00
[58] Field of Search...................21/91, 58, 78–80; 141/92, 89; 239/570, 571, 534, 368, 369, 143; 222/504, 394, 193; 53/7

[56] References Cited

UNITED STATES PATENTS

| 1,889,629 | 11/1932 | Bohmer et al. | 141/92 X |
| 2,885,845 | 5/1959 | Ryan | 53/112 R |
| 3,383,831 | 5/1968 | Goldsmith et al. | 53/167 |
| 3,466,841 | 9/1969 | Rausing | 53/28 |

*Primary Examiner*—Morris O. Wolk
*Assistant Examiner*—D. G. Millman
*Attorney*—Frank B. Hill

[57] ABSTRACT

An aseptic packaging machine for forming, antiseptically treating, filling and sealing containers while protecting them with a clear air atmosphere after they have been antiseptically treated by a bactericide. The antiseptic treatment is accomplished by a fogging system to provide for total contact by the bactericide with the internal surfaces of the container and includes ease of removal of the residual bactericide after the treatment.

8 Claims, 15 Drawing Figures

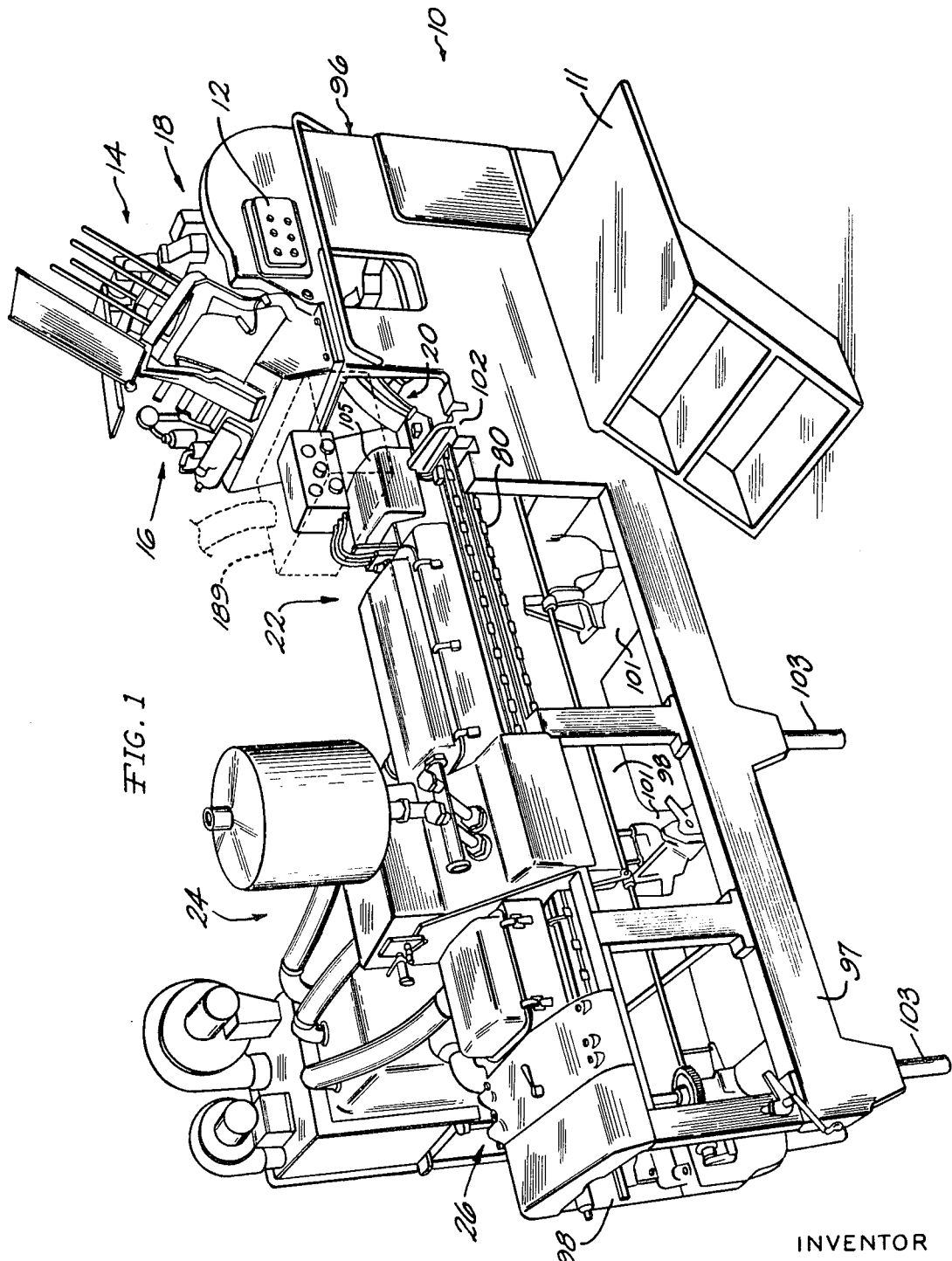

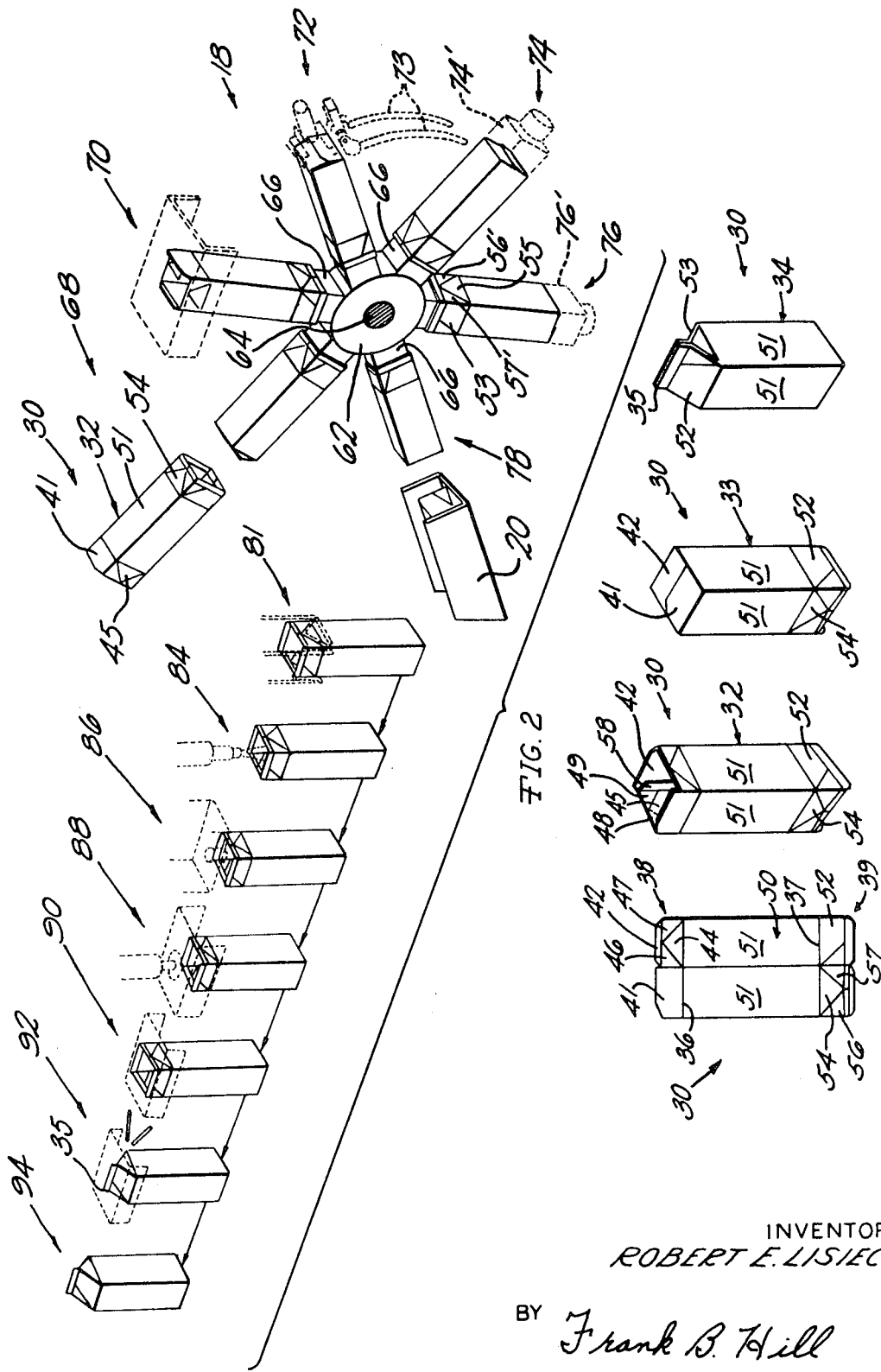

INVENTOR
ROBERT E. LISIECKI
BY Frank B. Hill
ATTORNEY

INVENTOR
ROBERT E. LISIECKI
BY Frank B. Hill
ATTORNEY

INVENTOR
ROBERT E. LISIECKI

BY Frank B. Hill
ATTORNEY

ASEPTIC PACKAGING MACHINE

This application is a division of application Ser. No. 708,337, filed Feb. 26, 1968, now U. S. Pat. No. 3,566,575.

The present invention relates broadly to a new and useful container packaging machine and more particular to a machine for aseptically filling and sealing paperboard containers and includes the method of forming, sterilizing, filling and sealing the paperboard container to provide an aseptically packaged product.

Various industries have found that central packaging for distant markets is a beneficial approach in their business activity and can assist them in developing strong market bases. With the increased emphasis on volume producing and marketing, may centers of population in reference to a products market base even extend across international boundaries. Thus, out of both necessity and convenience, situations have developed where essential production marketing areas extend over vast market areas. This type of product marketing has even extended into the comestible area and by so doing has caused a considerable interest in increasing the shelf life of various products which in the past need only short life. The longer shelf life is needed so that producers and suppliers can provide uniform top quality merchandise throughout their areas of distribution.

Other products of particular interest are the small volume items which have in the past been marketed in small trade areas. Examples of such products are whipping cream, coffee cream mixes, concentrated milk et cetera. These items are proving to be more unprofitable each year because of limited shelf life at the point of sale. This situation has greatly increased the cost of these products to the consumers because of extensive small unit handling and the high percentage of spoilage experienced in getting quality products to the consumers. This marketing problem has caused many approaches to be tested and tried to increase the storage life of various comestible and chemical products in an attempt to increase or establish a profit margin for the producers and suppliers.

There have been several philosophies generated in this packaging area to overcome the short shelf life situation. An example would be the concept of aseptic filling and packaging. Aseptic packaging has been utilized in some areas of the world but has still not reached acceptable market standards for many of the packages presently used in the market place and neither have systems which can be adapted to the equipment presently available in the packaging field be easily modified to accept these philosophies. In the aseptic filling and packaging field, there has been some systems attempted commercially that would use the dipping process with the package surfaces being covered with a liquid bactericide and mechanical squeeze rollers being utilized for removing the bactericide chemicals after the container has been aseptically treated.

The approach of dipping or covering the walls with a liquid and then mechanically wiping it clean has been practiced in the art mainly outside the United States but would seem to be a violation of the present packaging standards and parameters established by the U.S. Health Department. Other systems have been tried which utilize a spray approach. These systems require an extensive or unreasonable amount of time or distance to permit the necessary drying of the container package before it can be filled. This would be acceptable in some industries and some packaging fields that are designed or could be remolded to accept slow or bulky equipment; however, in many industries, this would be unmannageable or objectionable because speed and equipment size limitations are of great concern to the packagers. To sacrifice one of these would almost automatically increase the other; for example, slow equipment in certain industries, would require expanding plant facility to provide for more pieces of equipment because of the necessary product volume required. By increasing equipment size to get the necessary speed on one piece of equipment, the facilities would have to be altered to handle the enlarged equipment. The spray system has other drawbacks because in some of the package industries there is a serious question whether the spray is able to penetrate and permeate all the void areas in the package or container to give the quality of aseptic treatment which is needed for acceptable market requirements.

Accordingly among the objects of the present invention is to provide an aseptic filling system which can be utilized with the present filling equipment principles available by use of a sterlizing agent in the form of a fog.

Another object of the present invention is to provide equipment to form, sterilize, fill, and seal a container so that the contents are in an acceptable sterile condition.

Another object of the present invention is to provide a fail-safe unique metering system to meter a specific amount of bactericide fog spray which can be dispensed to each individual container.

A still further object of the present invention is to provide a controlled atmosphere of filtered, sterilized air under light pressure to control the atmosphere of the package or container after sterilization to protect it through filling and sealing stages.

Another object of the present invention is to provide the process for aseptically filling the coated paperboard container with comestible products.

Another object of the present invention is to provide means to maintain the sterile controlled atmosphere in the control area of an aseptic machine while the machine has been stopped for repair or shut down overnight.

A still further object of the present invention is to provide an aseptic forming, filling and sealing machine for paperboard containers with aseptic atmosphere while permitting ease of access to the various machine parts for repair, cleaning and maintenance.

Another object of the present invention is to provide a controlled air atmosphere filter system designed to provide arrangement for long filter life to critical filter elements with a protective pre-filter having ease of assembly and position.

Another object of the present invention is to provide aseptic filling machine system whereby the antiseptic element is dispensed to the container in a fog state so that all necessary areas of the container can be acted upon the antiseptic bactericide can then be acted upon by warm air to break it up into harmless parts and/or remove it from the container and immediately have the container prepared for filling with a minimum of time being required between the antiseptic fogging station and the filling station.

Another object of the present invention is to provide a dispensing unit that can continuously pass bactericide over the path of containers or packages to antiseptically treat them with bactericide in a fog state.

A still further object of the present invention is to provide a dispensing unit that can intermittently or continuously pass bactericide into containers or packages as they pass the dispensing unit to antiseptically treat them with bactericide in a fog state.

Another object of the present invention is to provide for a filtered sterile air atmosphere to surround the container or package and having means to move the air into the sterile air atmosphere area which will dispense it in a substantially uniform pattern to approach laminar flow so that eddy currents will be eliminated or reduced to a minimum as the air is passed through the unit to provide the sterile air atmosphere.

Still further objects and advantages of the present invention will appear as the description proceeds.

To the accomplishment of the foregoing and related ends, the invention, then, consists of an aseptic filling machine and equipment as hereinafter fully described and particularly pointed out in the claims, the annexed drawings and the following description setting forth in detail certain means for carrying out the invention, such disclosed means illustrating, however, but one of the various ways in which the principle of the present invention may be used.

FIG. 1 is a perspective view illustrating a packaging machine embodying the principles of the present invention.

FIG. 2 is a perspective schematic view illustrating the steps encompassed in the method of forming, antiseptically treating, filling and sealing the container as it passes through the packaging machine.

FIG. 3 is an illustration of a typical container as it would be presented to the packaging machine illustrated in FIG. 1 and it appears as a flat side seamed container blank showing the outside surface thereof of two of its side panels.

FIG. 4 is a perspective view of the container shown in FIG. 3 in open and tubular form as it appears when mounted on a mandrel before the top or bottom closure panels have been sealed.

FIG. 5 is a perspective view of the container shown in FIG. 3 and 4 after the bottom closure panels have been sealed and with the top closure panels remaining in an open condition.

FIG. 6 is a perspective view of a completed sealed container as it would appear after passing through and is discharged from the packaging machine as a filled container.

FIG. 11 is a partial cross-sectional end view through the aseptic air atmosphere system and the bactericide removal system taken generally along line 11—11 of FIG. 10.

Figure 7:
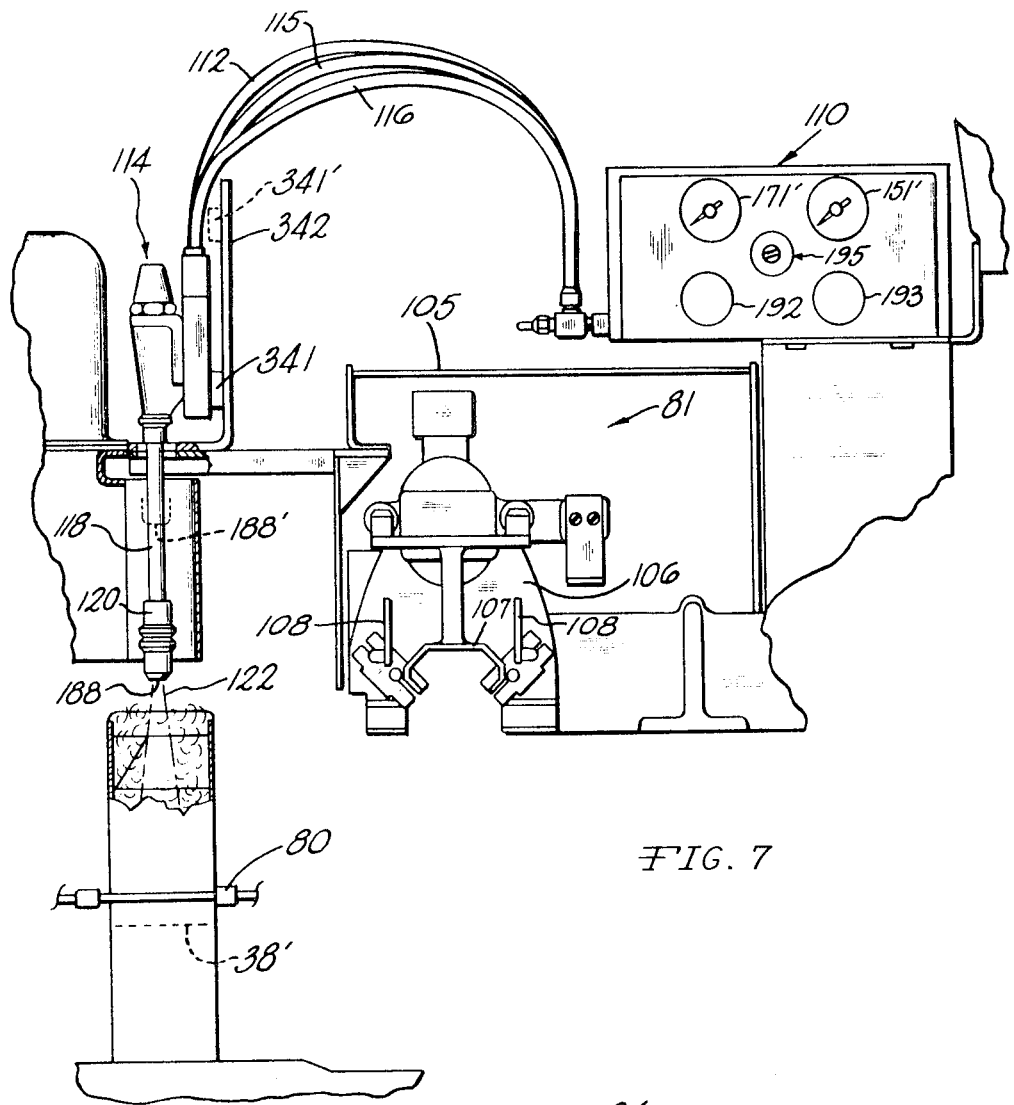
FIG. 7 is a partial side elevational view illustrating the top pre-breaking and antiseptic fogging stations of the packaging machine illustrated in FIG. 1.

Generally referring to FIG. 1 the overall packaging machine 10 will be discussed in reference to its general operation after which a more detailed discussion will be presented to point out the advancement in the art contributed by this invention. The packaging machine 10 has an operator platform 11 which the operator can stand on to control the packaging machine when it is running.

The operation of the machine can be governed by a control box 12. Container blanks, as will be explained in more detail below, in the form illustrated in FIG. 3 are positioned on the machine 10 at a container blank loader mechanism 14.

During the operation of the machine 10 the container blanks are removed from the container blank loader mechanism 14 by a feeder mechanism 16. The feeder mechanism 16 will open the container blank and position it on a mandrel, shown in FIG. 2 and referred to as 66, which is a part of a forming unit 18.

While the container is on the mandrels 66 the bottom closure of the container will be closed and sealed and then removed from the forming unit 18 when it reaches a transfer chute 20. The container will then pass to a top pre-breaker operation then on into the antiseptic fogging and drying unit 22 where a bactericide will sterilize the inside surfaces of the container.

The drying operation will remove the residual bactericide from the container and maintain the container in an aseptic condition as will be explained in more detail below. The container then continues through the machine into a filler unit 24 where the container will be filled while still remaining in its aseptic condition. The container continues through the machine and is passed on through to a sealer unit 26 at which time the container will have been aseptically sealed so that it can be passed out the end of the machine.

Referring to FIGS. 3 through 6 the container structure will be discussed briefly. The container is generally referred to as 30 and appears in various forms. The container form starts as a flat container blank 31 in which case both the bottom and top closure ends of the container are extended and the side walls are pressed together so that the bland 31 is in a flat form as illustrated in FIG. 3. This is the form that the container 30 is supplied to the packaging machine 10 at the container blank loader mechanism 14. The container 30 then is placed on the mandrels 66 and both the bottom and top closure ends are open and the container has been squared in tubular form ready for the bottom closure to be closed and sealed; as illustrated in FIG. 4. The container 30 is illustrated in the bottom closed position in FIG. 5 and is referred to as a bottom formed container 33 in which case the top closure or pouring end of the container is still in its open and extended position. FIG. 6 illustrates the container 30 in its final condition as a completed package and is referred to an an assembled and sealed container 34.

Referring now to FIGS. 1 and 2 the packaging machine 10 will have the container blank 31 loaded on the container blank loader mechanism 14 oriented as illustrated in FIG. 3. A complete discussion of the illustrated container 30 is given in U.S. Pats. Nos. 3,239,126 and 3,270,940 which were issued Mar. 8, 1966 and Sept. 6, 1966, respectively. For the purposes of the present invention only a general description in necessary to understand the principles of the present invention in reference to the illustrated container 30.

The container 30 is separated into three sections by score lines 36 and 37 which extend completely around the container. Referring to FIG. 3 the material above score line 36 is the bottom closure end 38 and the material below score line 37 is the top closure end 39. The bottom closure end 38 has a bottom closure panel 41, an extended bottom closure panel 42 and fold-in panels 44 and 45. Fold-in panel 45 is shown in FIG. 4. Fold-back panel 46 and 47 connect fold-in panel 44 with panels 41 and 42, respectively. Foldin panel 45 is connected to panels 41 and 42 by a pair of fold-back panels 48 and 49, respectively, as viewed in FIG. 4.

The portion of the container 30 between score lines 36 and 37 is a body portion generally referred to as 50. The body portion 50 in the present illustration is made up of four side panels referred to by numeral 51 which are connected to the bottom and top closure ends 38 and 39 by score lines 36 and 37, respectively. The top closure 39 has two roof panels, 52 and 53, illustrated in FIGS. 5 and 6 and two end panels 54 and 55, illustrated in FIGS. 2 and 3. The end panels 54 and 55 are connected to the roof panels 52 and 53 by fold-back panels 56-57 and 56'-57', respectively. Two of the side panels 52 are connected together by a side seam flap 58 which extends substantially the length of the container and is illustrated in FIG. 4.

The feeder mechanism 16 removes the flat container blank 31 from the container blank loader mechanism 14 in a timed relationship. Upon removal from the loader mechanism 14 the container blank 31 will be acted upon by various elements, these are well known in the art, which will open the container blank 31 and it will appear as an open container 32 illustrated in FIG. 4. The feeder mechanism 16 will then feed the open container 32 onto a mandrel 66 of a mandrel assembly 60.

The mandrel assembly 60 has a hub 62 which is supported by a rotatable shaft 64. The series of mandrels 66 are equally spaced around and mounted to the hub 62. As viewed in FIG. 2, a container 30 is placed in the form of an open container before it is positioned by the feeder mechanism 16 onto one of the mandrels 66, which is positioned at a loading station 68. After the open container 32 is placed on the mandrel 66 at the loading station 68, a pre-breaker, not shown but well known in the art, will act on the fold-in panels 44 and 45 causing the bottom closure 38 to have the various panels pre-broken around their various score lines.

After bottom closure 38 has been pre-broken at loading station 68 the mandrel 66 is indexed to the next position, which is heat station 70, where the bottom closure end 38 is pre-heated before the bottom is formed. At heater station 70 the bottom closure end 38 is exposed to 800° Fahrenheit air for approximately nine-tenth of a second which raises the surface temperature of the coated paperboard to approximately 220° Fahrenheit. The mandrel assembly 60 is then indexed to its next position where the extended bottom closure panel 42 is tucked between the bottom closure panel 41 and its adjacent fold-back panels 46 and 48. The mandrel assembly 60 is then indexed moving the mandrel 66 with the bottom tucked container to the next position which is a pressure pad station 74, guide rods 73 act on the bottom closure 38 to hold the bottom closure panels 41 and 42 in their tucked position. Immediately upon arriving at the pressure pad station 74 the pressure pad 74' will act upon the bottom closure end 38 causing the various bottom closure panels to be sealed together to provide a liquid tight bottom closure for the container 30 and putting it in form of the bottom formed container 33 as illustrated in FIG. 5.

In various modifications of the machine one or two pressure pad stations may be necessary. In the present case there is a second pressure pad station indicated at the next position as pressure pad station 76. This pressure pad 76' will act on the container 30 in a similar manner to pressure pad 74' by applying pressure to the bottom closure end 38. The pressure pads are water cooled and provide a cooling effect on the container's bottom closure end surfaces. The mandrel assembly 60 now indexes the mandrel 66 to an unload station 78 at which time a stripper device, not shown but well known in the art, will remove the bottom formed container 33 from the mandrel 66 and transfer the bottom formed container 33 onto the conveyor chain 80 via the transfer chute 20.

The conveyor chain 80 will move the container through the remainder of the packaging machine 10 and moves in timed relation to the indexing of mandrel assembly 60. The container will first be acted upon by the top pre-breaker and steepler station 81. The pre-breaker unit acts on the end panels moving them toward each other across the top of the container so that the score lines about top closure 39 are pre-broken to ease in future sealing. Steepler unit 83 acts on the top closure panel 39 to insure that the end panels extend in and not out so that a proper sealing rib 35 will be formed at the sealing unit 20, as viewed in FIG. 7A. The container is then indexed to the antiseptic treatment station 84 where the inside surfaces of the bottom form container 33 are acted upon by an antiseptic agent, the full function of which will be explained in more detail below. The container 30 is then indexed to a drying unit 86 which has various drying stations along its path, just one such station is illustrated and is appropriate for the present description. The function of the drying unit 86 is to pass warm air onto the container after it has been acted upon by the antiseptic treatment station 84. In the present case, the bactericide used in this system is hydrogen peroxide which breaks down when acted upon by heat into water, $H_2O$, which because of the fog type spray at antiseptic treatment station 84 will be passed from the container as a vapor and monatomic oxygen which quickly unites with itself to form oxygen, $O_2$. Because the antiseptic treatment station 84 dispenses the bactericide in the fog state, the drying unit 86 can be effective in a short time, thus requiring a short distance. After the drying unit 86 has completed its work on the container 30, the container is then passed to filling station 88 where the product which is to be put into the container is then dispensed into the open end of the container 30. In the present case, this is a milk packaging machine or a liquid packaging machine and at this station 88 the liquid will be dispensed into the container. The container then immediately passes into a top closure heating unit 90 which in a preferred embodiment selectively heats the top closures 38. After the top closures 38 are heated the container is transferred to a top closure sealing unit 92 where the top closure panels are brought together with a pressure and cooling action being applied on the sealing rib 35 to give an air tight liquid seal top end closure. The assembled and sealed container 34 is then passed from the sealing unit 92 onto a delivering station 94.

Referring generally to FIG. 1 and 7 the top pre-breaking station 81 and the aseptic treatment station 84 will be discussed in more detail in reference to their action on the containers as they pass through the packaging machine 10. The open container 32 will be removed from the mandrel 66 in a timed relationship and received by the transfer chute 20 which positions it on the timed conveyor chain 80 so that it can be moved through the remainder of the package machine 10. The conveyor chain 80 in the present illustration is a timed intermittent motion moving the open container 33 from one station to the next, a dwell time is provided at each station.

The packaging machine 10 is provided with a machine base 96 the complete structure of which will not be discussed in detail but it should be noted that the machine has side frames 97 and 98. The side frames 97 and 98 are secured together by a series of cross-ribs 101 and bridge members 102. Adjustable legs 103 are provided at the bottom of the side frames 97 and 98 so that the machine 10 can be properly leveled when positioned on the plant floor. The machine base 96 provides ample places to support and position the various components in a secured manner to the packaging machine 10.

A shield assembly 105 is provided over the top pre-breaker station 81. The top pre-breaker station 81 is provided with a movable support frame 106 which has an internal backing support 107 and a pair of end panel breaker wings 108 mounted on it. When the bottom formed container 33 is positioned under the top pre-breaker station 81 the movable support frame 106 will be lowered to position the internal backing support 107 inside the container and the end panel breaker wing 108 in alignment with the outside of the top closure 39 of the bottom formed container 33. The end panel breaker wing 108 are in the shape of a triangle and when lowered they will be cammed towards each other to act on the end panels 54 and 55 to pre-break the various top closure panel score lines reducing their rigidity so that the container will easily be closed after it has been treated by the aseptic treatment station 84 and filled at the filling station 88. After the pre-breaking operation the movable support frame 106 will then be raised back to its initial position illustrated in FIG. 7 and the conveyor chain 80 will move the bottom formed container 33 towards the antiseptic treatment station 84. The antiseptic treatment station 84, although adjustability of the fogging nozzle tip is permitted, is secured in a stationary position in reference to the bottom of the various sized containers.

The bottom formed container 33 illustrated in FIG. 7 is a typical quart paperboard milk container well known in the art. A fogging nozzle control unit 110 is provided. Full details of its operation will be explained below. A bactericide line 112 is controlled by the fogging nozzle control unit 110 and passes bactericide to the fogging nozzle assembly 114. Two air lines, 115 and 116, are provided and also are controlled by the fogging nozzle control unit 110 and these pass over to the fogging nozzle assembly 114. The fogging nozzle assembly 114 has a nozzle shaft 118 which extends towards the bottom formed container 33. A nozzle head 120 is provided at the end of the nozzle shaft 118 and passes the bactericide into the bottom formed container 33 by a fog path 122. The fog path is conical in form with the approximate angle of 13° for the present illustration. It is important the bactericide be in a peroxide, form to prevent the bactericide from forming droplets on the container and all inside surfaces of the container must be coated by the fog material.

Various bactericide materials could be used, however, for the present illustration a 35 percent hydrogen peroxide solution will be discussed. The bactericide will be dispensed in a fog path 122. The amount of bactericide used and transmitted to treat each bottom formed container 33 is in the range of 0.1 to 0.2 milliliters. The amount of bactericide can be controlled in a fail-safe manner by the fogging nozzle control unit 110. At this stage of the packaging machine 10 the inside surfaces of the bottom formed container 33 are aseptically cleaned internally. This condition is maintained while the container 30 is filled and sealed as will be explained in detail below.

Figure 7A:
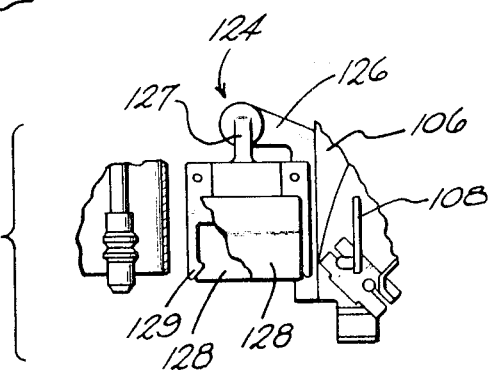
FIG. 7A is a partial illustration of FIG. 7 showing the top pre-breaker unit having a steepler device mounted on it to operate on the container after it is pre-broken and before it passes to the antiseptic fogging station.

Referring to FIG. 7A, a modified structure is illustrated similar to FIG. 7 showing a steepler unit 124 which is secured to the movable frame 106. The steepler unit 124 has a support member 126 which carries a positioning arm 127. The positioning arm 127 extends across the conveyor chain 80 and positions the working parts of the steepler unit 124 substantially over the middle of the bottom formed container 33. As the movable frame support 106 moves up and down as stated above, the steepler unit 124 and its associated parts move up and down with it. The support arm 127 is provided with two roof panel guides 128 which acts on the roof panels 52 and 53 moving them in towards each other. At the same time finger members 129, only one being shown, act on the end panels 54 and 55 moving them in towards each other and between the roof panels. In this modification the steepler unit 124 is positioned at a station between the top pre-breaker station 81 and the aseptic treatment station 84. In some packaging machines this steepler unit may not be necessary. In others the steepler unit may be provided between the filling unit 88 and the heating unit 90.

Figure 8:
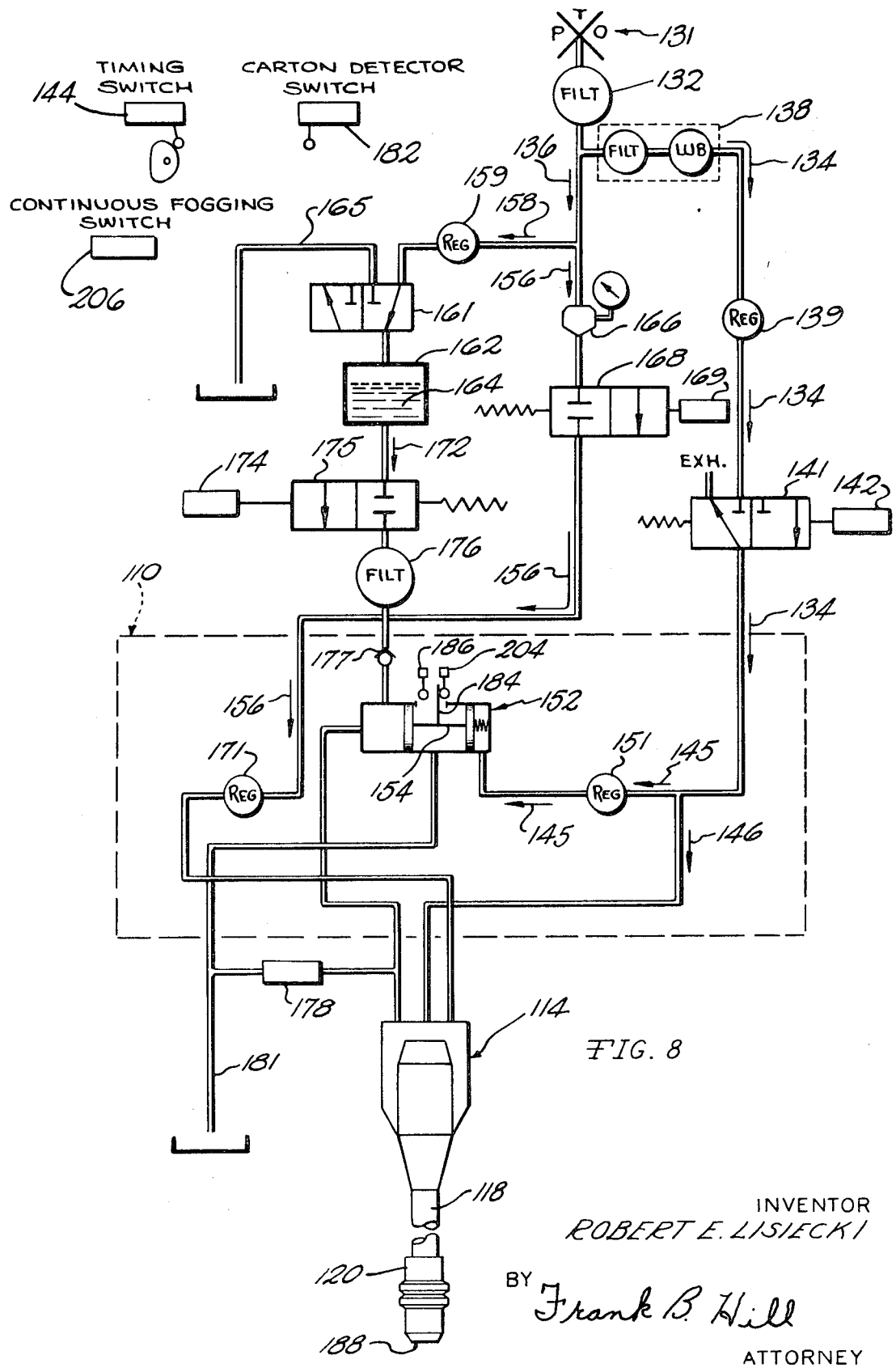
FIG. 8 is a schematic diagram illustrating the operation and functioning of the fogging station's operating system.
Figure 9:
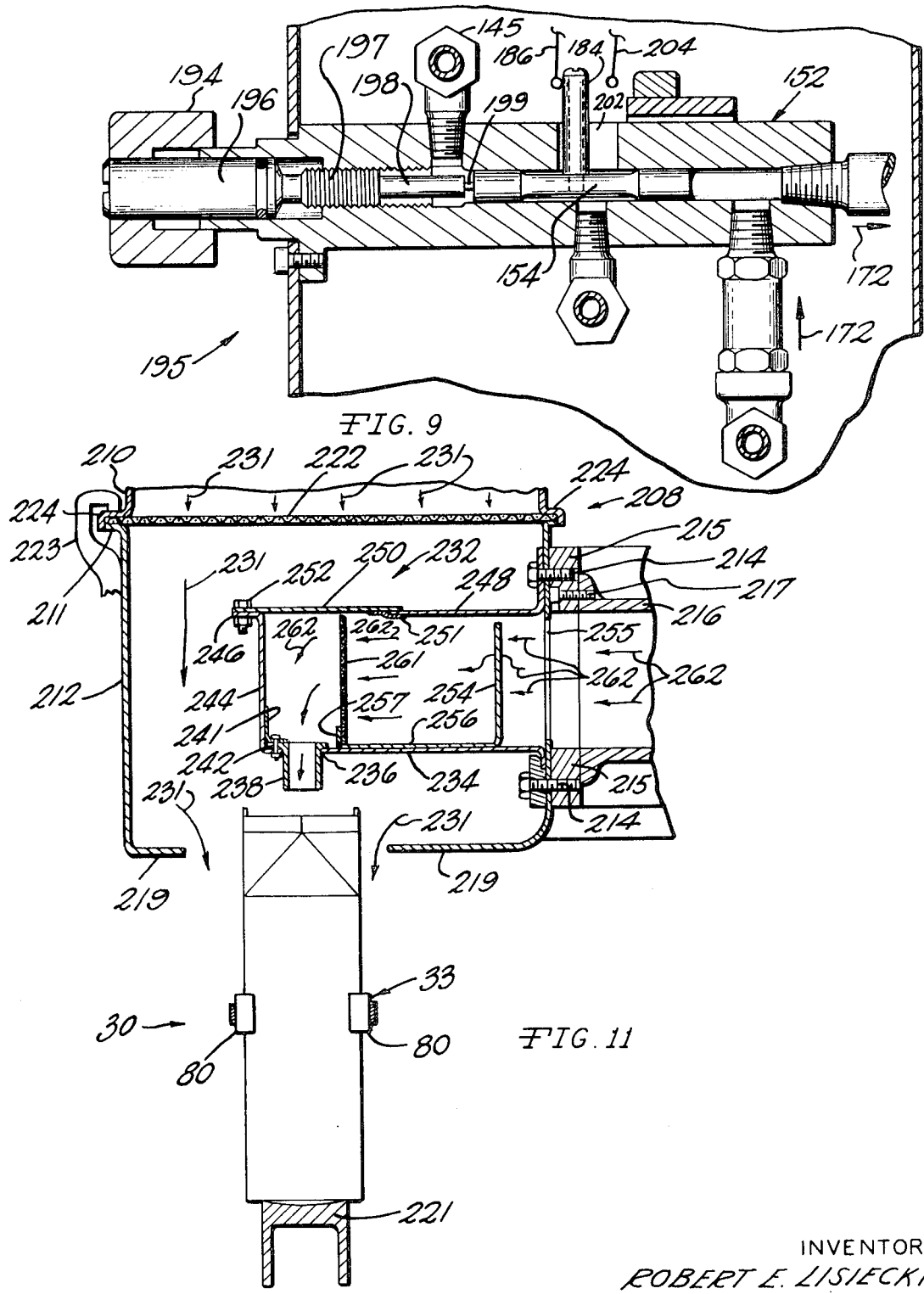
FIG. 9 is a partial sectional view illustrating the bactericide control valve of antiseptic fogging station which functions to meter the amount of bactericide used during the intermittent fogging operation.
Figure 10:
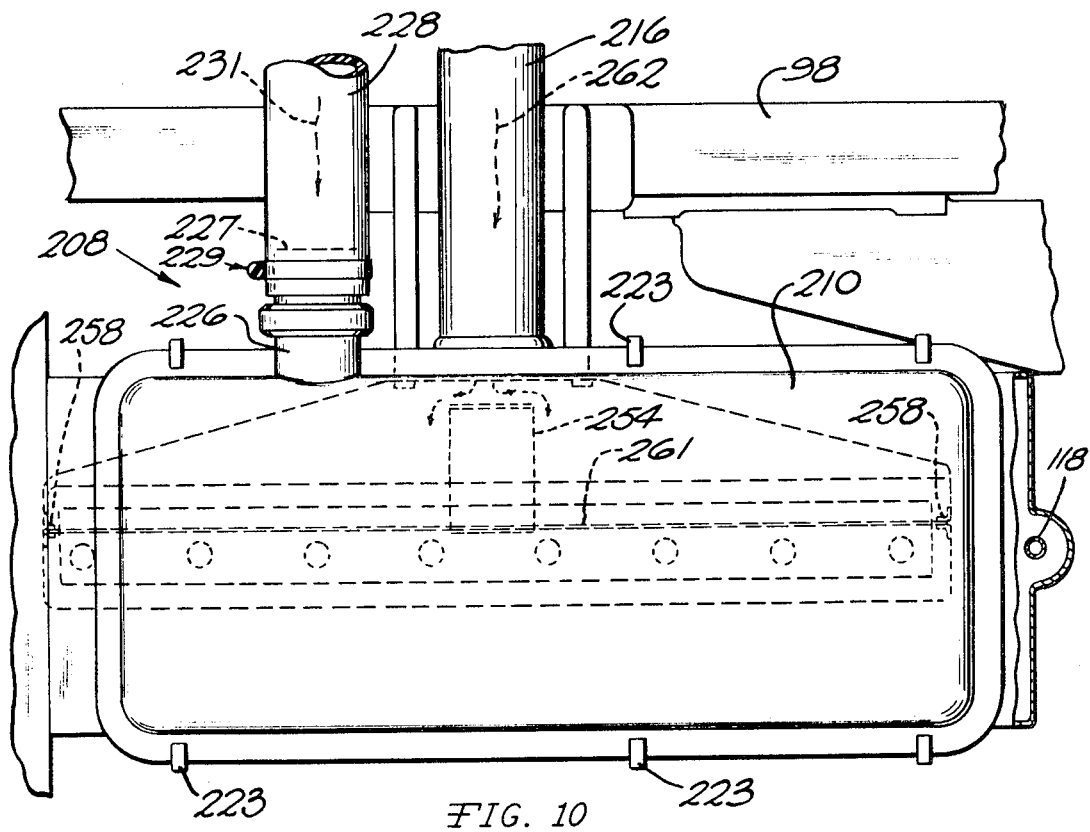
FIG. 10 is a top plan view illustrating the aseptic air atmosphere system and the bactericide removal system.
Figure 12:
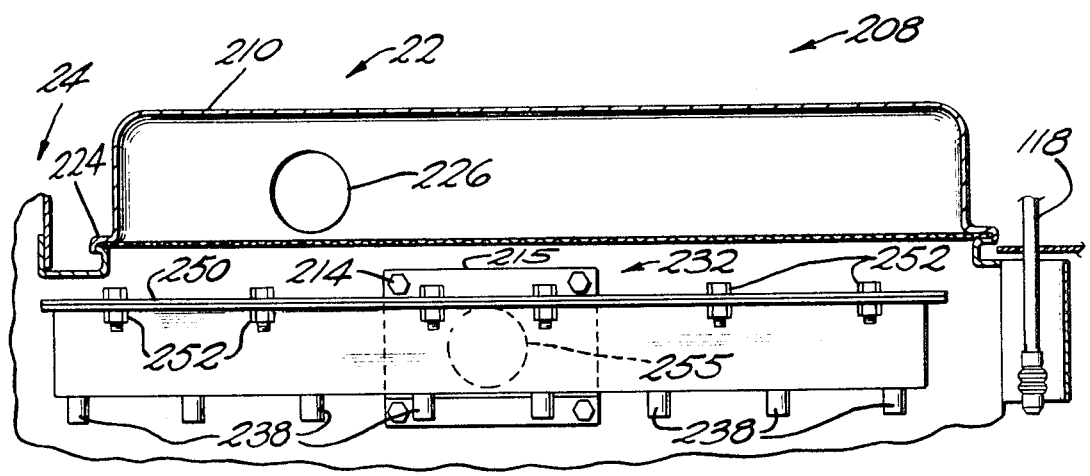
FIG. 12 is a partial cross-sectional side view of the aseptic air atmosphere system and the bactericide removal system taken generally along line 12—12 of FIG. 10.

Generally referring to FIG. 8, there is illustrated a plant air supply source 131 which passes its air through a filter-dehumidifier 132 before the air is passed into the packaging machine's 10 air supply system. The pressured air splits up and moves through two separate air systems. One air system is referred to as the needle valve air actuating system and its direction is indicated by arrow 134. The other air system is referred to as the container fogging system and its direction is indicated by arrow 136.

The needle valve air actuating system 134 which opens and closes a nozzle head 120 will now be discussed in detail. The pressured air entering this system passes through a standard industrial air filter 138 including a lubricating system where oil is added to it. The compressed air then passes through a pressure gage regulator number 139 at approximately 45 PSI. The air continues on through the system 134 and passes to a valve member 141 which is controlled by a nozzle cylinder solenoid 142. The nozzle cylinder solenoid 142 opens and closes the valve member 141 upon receiving a signal from a timing switch 144 which works in a timed relationship with the packaging machine 10 in a manner well known in the art. When the valve member 141 is open the compressed air proceeds along the line until it is separated into two sub-systems represented by directional arrows 145 and 146.

Sub-system 146 permits the compressed air to pass straight on through the system 134 to the fogging nozzle assembly 114 and thus to open up the nozzle head 120, the full function of which will be explained later in more detail. When the nozzle cylinder solenoid 142 has the valve member 141 closed the compressed air will then be passed through the exhaust portion of the valve member 141 and an integral spring valve causes the nozzle head 120 to close.

The other sub-system 145 passes air through a bactericide pressure gage regulator 151. After the air passes through the regulator 151 it continues into a spool valve assembly 152 and moves a spool valve 154 to the left as viewed in FIG. 8, the full function and purpose of which will be explained in more detail below. These functions just discussed will be controlled in a timed manner by timing switch 144 to operate in conjunction with the operations of the other compressed air system and the bactericide system.

The other compressed air system 136 is immediately separated into two sub-systems represented by arrows 156 and 158. The sub-systems 158 passes the compressed air through an air pressure regulator 159 which passes it on to a manual valve 161. The compressed air passes through the manual valve 161 and acts on the storage tank 162 to control the pressure of a liquid bactericide 164. The manual air valve 161 functions to pass the compressed air to the storage tank 162 to pressurize the bactericide 164 or to an exhaust line 165 to depressurize the storage tank 162 to atmospheric pressure when filling and other functions make this necessary.

The other sub-system 156 of the compressed air system 136 passes the air on through a pressure gage 166 and then on to a fogging valve 168 which is controlled by a fogging cylinder solenoid 169. The valve 168 will be opened by the fogging cylinder solenoid 169 upon signal from the timing switch 144 and operate in conjunction with the compressed air system 134 and this will be explained in more detail below.

When the air passes through this system 136, it will pass on through a nozzle air pressure regulator 171. The regulator 171 controls the air pressure as it passes into the fogging nozzle assembly 114 to be mixed with the bactericide to form the fog which places the container in its aseptic condition, this will be explained in more detail below.

Now referring to the bactericide system represented by directional arrow 172, the bactericide 164 is held in the storage tank which will be under pressure from the compressed air controlled by manual air valve 161 as explained above. A bactericide solenoid 174 controls a bactericide valve 175 and opens it upon signal from the timing switch 144 which permits the bactericide to pass to the fogging nozzle assembly 114 to mix with the compressed air from the compressed air system 136 to form the fog treatment. After passing through the bactericide valve 175, a filter 176 is provided to filter the bactericide. The bactericide then passes through a check valve 177 when permitted and passes into the spool valve assembly 152 to operate on the opposite end of the spool valve 154. When the compressed air is closed to the spool valve assembly 152, the bactericide passes through the check valve 177 and moves the spool valve 154 to the right as viewed in FIG. 8. When the compressed air is acting on the spool valve 154 under pressure, the check valve 177 is closed and a measured volume of bactericide will then pass from the spool valve assembly 152 on down through the system to the fogging nozzle assembly 114. Before the bactericide enters the fogging nozzle assembly 114, it can be bled-off to exhaust by a manual valve 178. The valve 178 is provided to purge the system at start-up and other times as necessary and it passes the bactericide to a bactericide drain line 181. Usually the bactericide will continue on into the nozzle head 120. The major function of the drain line 181 is to receive drainage from spool valve assembly 152 as will be explained in more detail below.

A carton detector switch 182 is provided on the packaging machine 10. The function of the carton detector switch 182 is to signal the timing switch 144 when a container 30 is in position to receive the fog antiseptic treatment. If the carton detector switch 182 does not signal the presence of a container 30 to the timing switch 144, the bactericide fogging system will not be activated. If a container 30 is in position to be aseptically treated, the carton detector switch 182 will sense this and signal the timing switch 144. The timing switch 144 will then follow through with its function and activate the system.

When the container is in position to have the antiseptic treatment the spool valve assembly 152 will be filled with bactericide as illustrated in FIG. 8. The nozzle cylinder solenoid 142 will open up its valve 141, passing compressed air to the compressed air side of the spool valve assembly 152. This will cause the spool valve 154 to move to the left side of the spool valve assembly 152 applying pressure on the bactericide which will close the check valve 177 and pass a measured volume of bactericide into the fogging nozzle assembly 114 to be mixed with the compressed air from the compressed air fogging line system 134. A switch dog 184 will then actuate a switch member 186 to signal the timing switch 144 that the bactericide has been discharged, at the same time the nozzle cylinder solenoid 142 is activated to open the valve member 141, fogging solenoid 169 is actuated to open the fogging valve 168 which will pass compressed air into the fogging nozzle assembly 114 to mix with the bactericide 164 to antiseptically treat the container 30 before it is filled, sealed and passes out the end of the packaging machine 10. The parameters of temperature, flow, and pressure acting on the mixture of the bactericide and the compressed air is such that a fog is produced as the bactericide is distributed from the nozzle head 120, as shown in FIG. 7.

As shown in FIG. 7, the nozzle head's 120 fog path 122 is distributed in the configuration of a 13° cone as it passes into the container 30. A nozzle tip 188 is positioned a predetermined distance from the container so that a direct impact of the fog cone is not placed on the container bottom. This eliminates the possible formation of bactericide droplets from forming in the container 30. Droplets require an extended amount of time to dry thus the bactericide is used in a fog state. In the present illustration, the container 30 will be passed from the antiseptic fog treatment station 84 to the drying unit 86 where hot air is applied to the bactericide fog after it has treated the container 30 and placed it in an aseptic condition. The hot air substantially will break the residual active bactericide down into stable, harmless vapors. An example in reference to the present illustration, the bactericide would be hydrogen peroxide, $H_2O_2$, which when having heat applied to it, will break down to water, $H_2O$, and monatomic oxygen, O. The oxygen will immediately combine with itself to form molecules of oxygen, $O_2$. Excess vapors of the bactericide may be vented from the area, if necessary, by a suitable exhaust system shown in phantom as vent hood 189 in FIG. 1.

Referring to FIG. 7, we have the fogging nozzle control unit 110 which shows the bactericide pressure regulator gage 171' and the nozzle air pressure regulator gage 151' and a control knob on each, indicated as 192 and 193, respectively. In the middle of the front panel is a control valve assembly 195 which can be set to control the amount of bactericide delivered to each container during the antiseptic operation when operating on intermittent fog discharge.

The control valve assembly 195, as best seen in FIG. 9, is provided with an adjustment knob 194. The knob 194 is connected to and turns a shaft 196. The shaft 196 controls the spool valve 154 of the spool valve assembly 152 to determine the bactericide discharge, as will be explained. The shaft 196 has a threaded tip 197 with a stop end 198 having a stop tip 199 that acts with the spool valve 154 to give a positive stop in its retracted or left position as viewed in FIG. 9. In the middle of the spool valve 154, the switch dog 184 is connected to the spool valve 189 and extends out through a dog opening 202 and actuates the switches 186 and 204. Switch 186 signals the timing switch 144 that the bactericide has been passed so the nozzle head 120 can be closed. Switch member 204 signals the timing switch 144 that a new metered amount of bactericide is ready to treat a container. When the aseptic system is waiting for another container to be put into position, to be antiseptically treated, the control valve assembly 195 will appear as shown in FIG. 8 and 9. The control valve assembly 195 can give a varied positive stop arrangement to the spool valve 154, thus controlling the volume of space available in the spool valve assembly 152 to receive the bactericide from the storage tank 162. In this manner it controls the amount of bactericide which is available for delivery to each container. Bactericide will come into the spool valve assembly 152 when the spool valve 154 is moved to the left as viewed in FIG. 9. When the spool valve assembly 154 is pushed to the right by the compressed air from line 145 it will push the bactericide out through the end of the spool valve assembly 152 as indicated by arrows 172 and the check valve 177 will be closed as discussed above. This will provide a fail-safe feature in that when the hydrogen peroxide is being delivered to the nozzle head 120 the bactericide solenoid 174 will close the bactericide valve 175 preventing it from letting any more hydrogen peroxide from coming into the bactericide system for delivery to the positioned container. The amount of hydrogen peroxide can be easily controlled to a very critical degree to prevent any danger from taking place. If there is any stoppage in the compressed air system the fogging unit cannot function at all.

In some applications intermittent operation of the fogging nozzle assembly 114 is not desired. For continuous operation of the fogging nozzle assembly 114 a continuous fogging switch 206 will be turned on. The switch 206 overrides the timing switch 144 and the carton detector switch 182 permitting continuous operation of the fogging unit as will be explained below. The bactericide pressure gage regulator 151 will be set at zero pressure. This will cause the spool valve assembly 152 to have its spool valve 154 remain in the right position, as illustrated in FIG. 8, for the complete operation of continuous fogging treatment. The nozzle cylinder solenoid 142 will hold valve member 141 in a continuous open position. This permits the nozzle head 120 to remain open continuously.

Fogging cylinder solenoid 169 will be activated to continually hold fogging valve 168 in its open position permitting a continuous flow of compressed air to pass through sub-system 156 to the fogging nozzle assembly 114. The bactericide solenoid 174 is activated to hold the bactericide valve 175 in an open position to permit a continuous passage of bactericide 164 through the bactericide system. The spool valve 154 will remain in the right position of spool valve assembly 152 as stated above. The spool valve 154 will not reciprocate thus permitting the check valve 177 to continually pass bactericide through the bactericide system onto the fogging nozzle assembly 114. The bactericide 164 arriving at the fogging nozzle assembly 114 will then mix with the compressed air passing from the container fogging system 136 and this mixture will be discharged as a bactericide fog through the nozzle tip 188 as explained above.

As illustrated in FIG. 7 the container 30 when it has been aseptically treated is under the control of the aseptic fogging and drying unit 22. From this stage on the top of the container is protected by an aseptic atmosphere until is has been filled, sealed and discharged from the machine.

Referring generally to FIGS. 10, 11 and 12 a cover assembly 208 is mounted to the side frame 98. A cover member 210 is mounted on a support flange 211 of an air control housing 212. The air control housing 212 is mounted by securing bolts 214 to a support bracket 215. The support bracket 215 is mounted to a heater duct 216 by a series of securing bolts 217. The heater duct 216 is part of and inherent to the side frame 98. The air control housing 212 has a bottom cover 219 which is split to permit passage of the container 30 along its length as viewed in FIG. 11. The container 30's top opening is projected into the air control housing 212 and extends above the bottom cover 219. Guide rails 221 run the length of the packaging machine 10 to support the bottom of the container as it is moved along its path of travel by the conveyor chain 80. A directional screen 222 is supported on the support flange 211 and held in place by flange edge 224 of cover member 208. A series of clamp members 223 clamp the directional screen 222 between the support flange 211 and the flange edge 224.

The cover member 208 has a pressure air receiving duct 226 which extends towards the side frame 98. The pressure air receiving duct has a tube receiving tip 227 which receives a pressure air tube 228. A clamp 229 secures the tube 228 to the tip 227. The pressure air tube 228 passes air under low pressure into the cover member 208. The air then passes through the directional screen 222 which substantially puts the air flow in a laminar flow pattern, as indicated by pressure air flow arrows 231. This air has been put in aseptic condition as will be explained in more detail below. As the pressure air passes through the cover assembly 208 of the antiseptic fogging and drying unit 22, it flows out through the opening provided in the bottom cover 219 preventing atmospheric air from entering the air control housing 212 and contacting the top area of container 30.

A hot air covering assembly 232 is positioned inside the air control housing 212 and is mounted to the support bracket 215 by the securing bolts 214. A housing bottom wall 234 is positioned above the bottom cover 219 and has a series of outlets 236 which are spaced along the path the conveyor chain 80 moves the container 30. Nozzle members 238 are positioned in the outlets 236 and are located substantially at the center of the container as it moves intermittently along its path of travel. The nozzle member 238 is held in position by an L-clamp 241 which is secured in contact with the nozzle members 238 by a series of nuts and bolts 242. A housing member 244 encloses the sides of the hot air covering assembly 232 and provides a flange 246 at its upper end. A top shield member 248 is positioned over a portion of the upper area of the hot air covering 232. An opening is provided between the flange 246 and the top shield member 248. A cover shield 250 is provided and has a locking groove 251 which connects it to the top shield member 248. At its other side the cover shield 250 is supported by the flange 246 and secured there by a series of nuts and bolts 252.

A baffle plate 254 is positioned in the hot air covering assembly 232 a short distance from an inlet opening 255 of the air control housing 212. The inlet opening 255 is aligned with the heater duct 216. The baffle plate 254 has a bottom plate 256 which is secured to the housing bottom wall 234 of the hot air covering assembly 232. This can be accomplished by various means well known in the art such as spot welding for example. Adjacent the outlet 236 the baffle plate 254 provides a positioning flange 257. The housing member 244 is provided with positioning clips 258 at its opposite ends which are aligned with the position flange 257 and they receive a directional screen 261.

A heater unit not shown heats air and supplies it to the container 30 through the hot air covering assembly 232 at approximately 450° Fahrenheit. The air is filtered before it is drawn into the heater and then it is blown at a high flow rate from the heater through the heater duct 216 into the hot air housing assembly 232. As it enters the housing assembly 232 it contacts the baffle plate 254 and is disbursed around it causing the hot air to fill the housing assembly 232. As the hot air continues to pass as illustrated by the directional arrows 262, the directional screen 261 will minimize the turbulence in the air and distribute it in substantially a laminar flow through the screen 261. As the hot air passes to the other side of the directional screen 261 it is discharged through the nozzle member 238 and passes into the container 30. As the hot air enters the container it will cause hydrogen peroxide to be broken down into water vapor and oxygen. Some of the hydrogen peroxide or bactericide will be blown out of the container and not be broken down in some cases. If necessary an exhaust system such as exhaust hood 189 could be provided over the antiseptic fogging and drying unit 22. After the container has passed under all the nozzle members 238 it will then pass to the filler unit 24 under protection of an aseptic pressure air atmosphere similar to the atmosphere provided by the air control housing 212.

The container 30 is filled at the filling unit 24 and passes to the heating unit 90 where the top closure and its associated surfaces will be heated to place it in condition for sealing. After the heating unit 90 has acted upon the top closure 39, top closure guide rods will act further on the roof panels 52 and 53 moving them together into sealing condition so that when a container arrives at the sealing unit 26 or the top sealing unit 92, pressure jaws will apply pressure and give a cooling effect to accomplish the sealing of the top closure. Then the container will be passed from the control atmosphere to the delivering station 94. The filling, heating and sealing operations are well known in the art and are discussed in detail in various U.S. Patents; as for example, in U.S. Pat. No. 3,249,025 which issued May 3, 1966.

Figure 13:
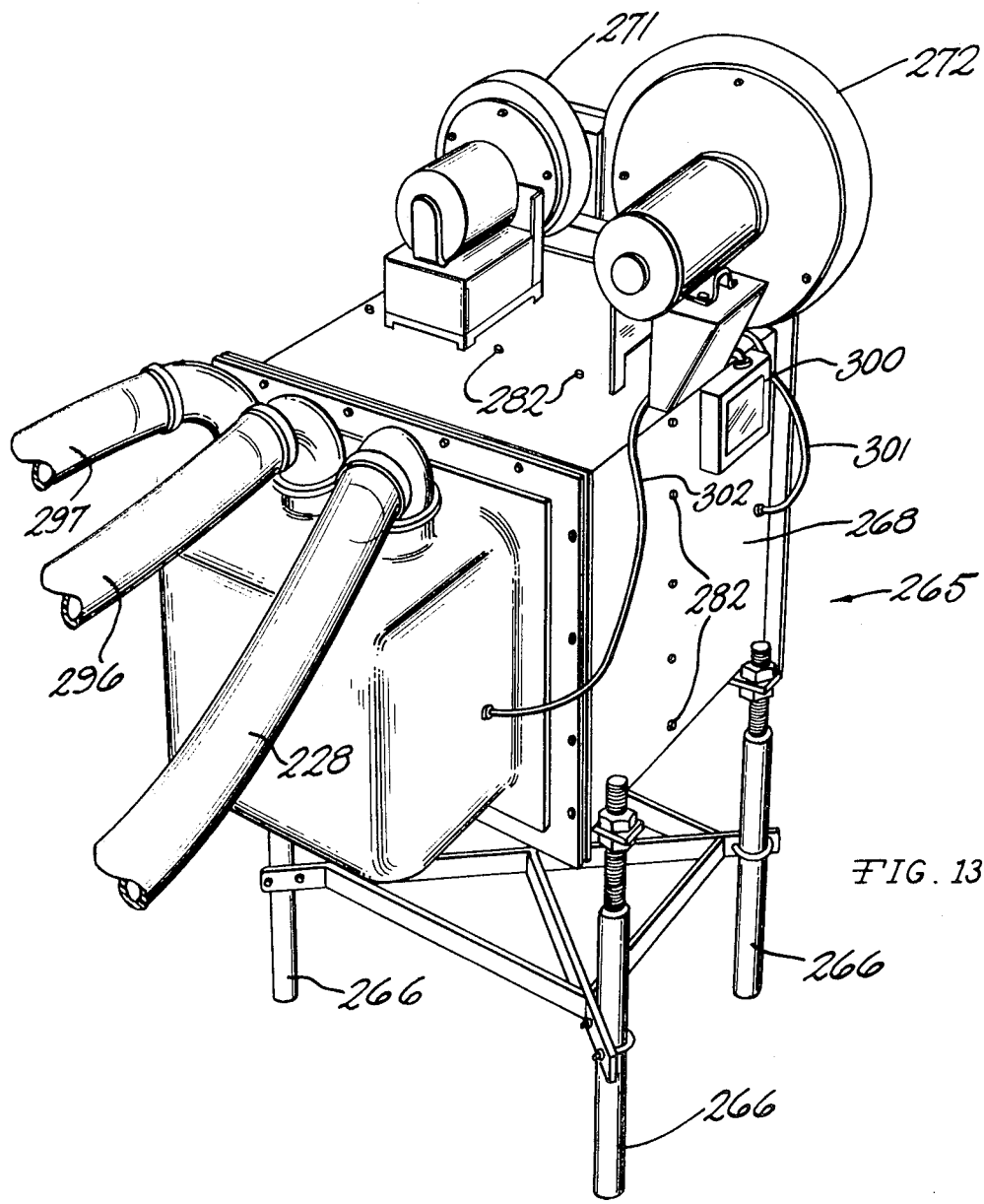
FIG. 13 is the perspective view of the aseptic air filter system used to provide the aseptic air atmosphere system in the packaging machine illustrated in FIG. 1.
Figure 14:
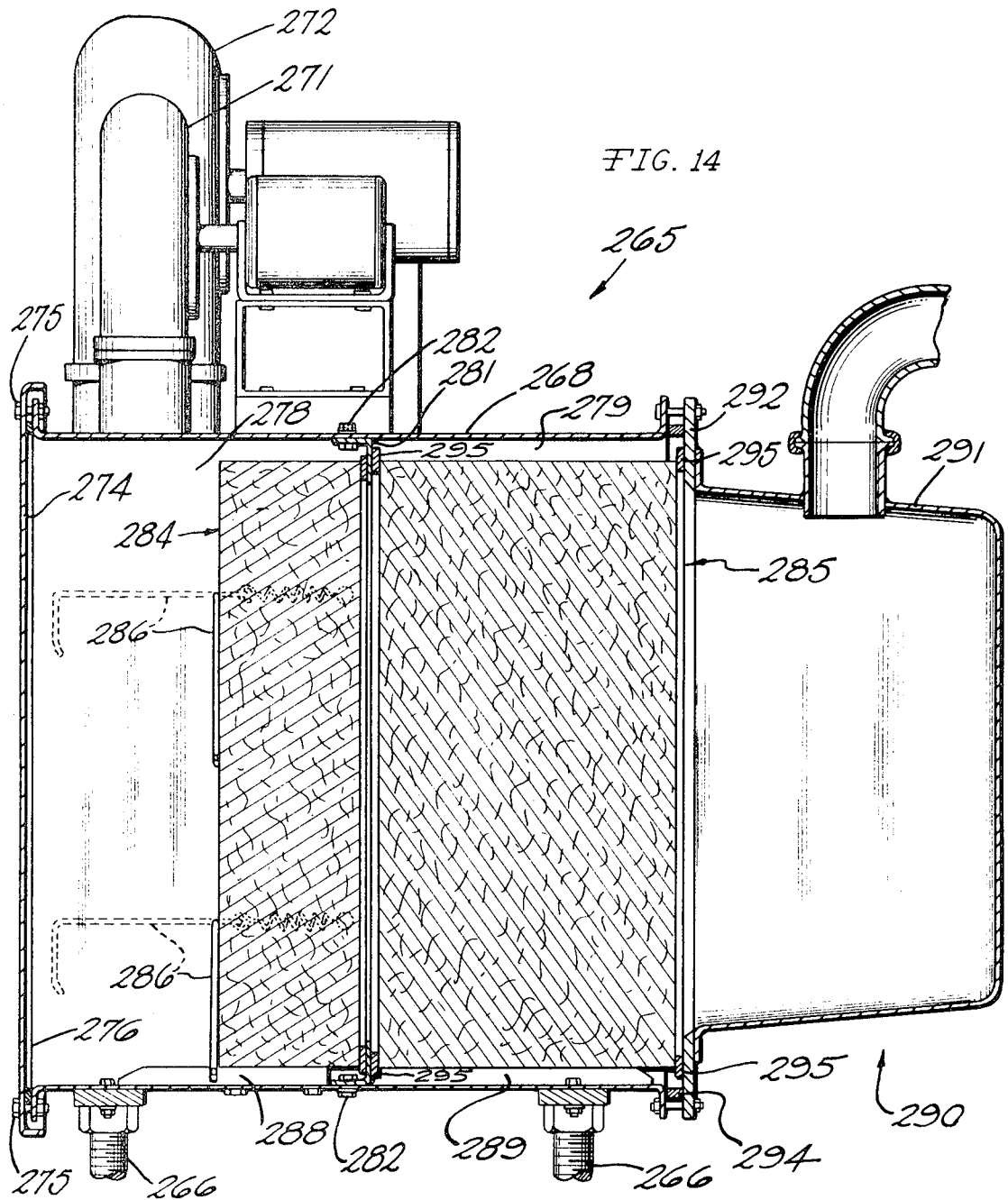
FIG. 14 is a partial cross-sectional view taken substantially through the middle portion of the aseptic air filter system illustrated in FIG. 13.

Referring generally to FIGS. 13 and 14, the process for providing aseptic air for the protective atmosphere while the container is in the antiseptic fogging and drying unit 22, the filling unit 24 and the sealing unit 26 will now be discussed. An air filter assembly 265 is provided with four adjustable legs 266 which support a filter housing 268. A continuous pump 271 and a flow pump 272 are mounted on top of the filter housing 268. An air-tight front cover 274 is mounted on the front end of the filter housing 268 by a series of bolts 275. A seal member 276 is positioned between the front cover 274 and the flange on the end of the filter housing 268 to provide the air-tight condition.

The filter housing 268 is separated into a receiving chamber 278 and a discharge chamber 279 by a flange member 281. The flange member 281 is secured in the filter housing 268 by a series of bolt members 282. A disposable filter 284 and a permanent filter 285 are provided in the receiving chamber 278 and the discharge chamber 279, respectively. The disposable filter 284 is provided to remove most of the large particles and impurities in the atmospheric air received from the pumps 271 and 272. The filter 284 will have to be changed periodically to assist in maintaining the packaging machine 10 in its aseptic condition. The disposable filter 284 can easily be removed by removing the front cover 274 and taking the disposable filter 284 out and replacing it with a new disposable filter. Removal handles 286 are provided for ease of removing the filter. The handles 286 have securing tip which contact the end of the filter 284 and by simply pulling the handles away from the disposable filter 284 it is released from its clamped position. Guide rods 288 are provided so that the new disposable filter 284 can be guided into position, then the removal handles 286 can be quickly moved into clamping position again. The removal handles 286 are spring loaded and anchored to the filter housing 268. The removal handles 286 are shown in a normal position in FIG. 14 with a phantom position shown illustrating their location when unclamping the disposable filter 284.

The disposable filter 284 may require replacement every 2 to 3 months. The permanent filter 285 is provided to remove small particles and put the air in final sterile condition. There will be only a small amount of impurities which this filter must remove, therefore it will last a considerable length of time; for example, it may require replacement every 12 to 24 months. The permanent filter 285 is mounted on guide rods 289 and is clamped in position by a manifold assembly 290. The manifold assembly 290 has a manifold cover 291 which is secured to a manifold flange 292. A resilient seal member 294 is provided between the flange end of filter housing 268 and the manifold assembly 290. The permanent filter 285 is provided with air-tight seal tips 295 which make air-tight sealing contact between the flange member 281 and the manifold flange 292.

The entering air is pumped into the receiving chamber 278 by the pumps 271 and 278 and passes through the disposable filter 284, on through the permanent filter 285 and then to the manifold cover 291 where it is then distributed to the various parts of the machine. In the present illustration we have one pressure air tube 228 which passes the aseptic air to the antiseptic fogging and drying unit 22, a second pressure air tube 296 which passes the aseptic air to the filler unit 224 and a third pressure air tube 297 which passes the aseptic air to the sealing unit 226. These units are interconnected in the packaging machine 10 so that there is a continuous aseptic air atmosphere protecting the top of the container after it has been antiseptically treated as explained above.

A gage 300 has one lead line 301 and a second lead line 302 connected to the receiving chamber 278 and the manifold assembly 290, respectively. The gage 300 shows the pressure differential between the receiving chamber 278 and the manifold assembly 290. As the disposable filter 284 continues to collect the impurities in the atmospheric air the pressure in the receiving chamber 278 will increase and will restrict air flow and this will be shown by gage 300 as an increased differential in pressure. At the proper gage differential the operator will know that the disposable filter 284 should be replaced, thus permitting proper disposable filter 284 replacement and eliminating early disposal or late disposal of the filter 284.

When the machine is not in operation either when the day's run is complete, overnight shut down, or over weekends shut down, the continuous pump 271 will continue to pass air through the air filter assembly 265. The flow pump 272 will be shut off to terminate its air flow. This continuous air flow from the continuous pump 271 prevents the permanent filter 285 from becoming contaminated and also assists in maintaining the contamination free provisions in the packaging machine 10.

In order to prevent the fogging cone 122 from striking the bottom of the container the nozzle tip 188 is positioned a certain distance away from the bottom to prevent the velocity of the fog path from being great enough to cause impact with the container bottom that would form droplets. The present packaging machine 10 can run a variety of container sizes having the same cross section. When smaller size containers are to be processed through the machine the guide rails 221 will be raised so that the top closure 39 of the container 30 will remain in its same position of orientation through the machine. The present illustration shows a quart size container. Referring to FIG. 1, if, a pint size container was going to be passed through the machine the guide rails 221 would be raised to position the bottom closure as illustrated by phantom line 38'. To prevent the formation of droplets as discussed above the nozzle tip 188 can be raised to a higher position, such as position 188'. Adjustment of the fogging nozzle assembly 114 is permitted by loosening a mounting block 341 and moving it to a pre-determined position indicated as 341' and then securing it again to a mounting bracket 342. The adjustment in various combinations could be numerous and this one example is discussed so that the principle could be understood by those skilled in the art.

From the foregoing description, it will be seen that a novel and advantageous packaging machine has been disclosed. Attention, however, is again invited to the possibility of making variations which would fall within the spirit and scope of the invention as illustrated and described above.

Other modes of applying the principles of my invention may be employed instead of those explained, change being made as regards the means and steps herein disclosed, provided those stated be any one of the following claims or their equivalent be employed.

I therefore particularly point out and distinctively claim as my invention:

1. A container aseptic treating unit using an antiseptic agent comprising, in combination:
   a. a fluid pressure supply means,
   b. an antiseptic agent storage tank,
   c. a fogging nozzle and means for supporting an at least partially formed container with the interior surfaces thereof in alignment with said nozzle,
   d. said fluid pressure supply means having a first conduit means running to said antiseptic agent storage tank, e. said antiseptic storage tank having a second connector means running to said fogging nozzle to pass said antiseptic agent to said fogging nozzle,
f. said fluid pressure supply means having third and fourth conduit means running to said fogging nozzle,
g. said third conduit means passes said fluid pressure supply to said fogging nozzle to mix said fluid with said aseptic agent to form an antiseptic mixture,
h. said fourth conduit means provides fluid pressure to said fogging nozzle to open and close said fogging nozzle permitting said antiseptic mixture to be discharged, and
i. said fogging nozzle in the open position discharges said antiseptic mixture in a fog state.

2. A container aseptic treating unit as claimed in claim 1, including:
a. a control system acting on said container aseptic treating unit to cause continuous opening of said fogging nozzle when said containers are passing through it.

3. A container aseptic treating unit as claimed in claim 1, including:
a. a control system acting on said container treating unit adaptable to cause either continuous opening of said fogging nozzle when said containers are passing through said unit or intermittent opening and closing of said fogging nozzle when a container is positioned below said fogging nozzle in position to be acted on by said antiseptic mixture.

4. A container treating unit as claimed in claim 1, including:
a. a spool valve assembly acting with said second conduit means to cause a specific amount of antiseptic agent to be metered and ready to treat each container, and
b. said fourth conduit means to act on said spool valve assembly causing it to pass said specific amount of metered antiseptic agent to said fogging nozzle when said fogging nozzle opens.

5. A container treating unit as claimed in claim 4, including:
a. hydrogen peroxide as said antiseptic agent,
b. removal means to remove said antiseptic fog from said containers, and
c. said removal means including means for passing hot air into said container.

6. A container aseptic treating unit as claimed in claim 1, including:
a. a control system acting on said fourth conduit means to control the passage of fluid to said fogging nozzle to cause the opening and closing of said fogging nozzle when a container is positioned below said fogging nozzle in position to be acted on by said antiseptic mixture.

7. A container treating unit as claimed in claim 6, including:
a. a spool valve assembly acting with said second conduit means to cause a specific amount of antiseptic agent to be metered and ready to treat each container, and,
b. said fourth conduit means to act on said spool valve assembly causing it to pass said specific amount of metered antiseptic agent to said fogging nozzle when said fogging nozzle opens.

8. A container treating unit as claimed in claim 7, including:
a. hydrogen peroxide as said antiseptic agent,
b. removal means to remove said antiseptic fog from said containers, and
c. said removal means including means for passing hot air into said container.

* * * * *